US009214011B2

(12) United States Patent
Wei et al.

(10) Patent No.: US 9,214,011 B2
(45) Date of Patent: Dec. 15, 2015

(54) CAMERA DEFOCUS DIRECTION ESTIMATION

(71) Applicant: SONY CORPORATION, Tokyo (JP)

(72) Inventors: Jianing Wei, San Jose, CA (US); Alexander Berestov, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/269,990

(22) Filed: May 5, 2014

(65) Prior Publication Data

US 2015/0317770 A1    Nov. 5, 2015

(51) Int. Cl.
*G06T 5/00*    (2006.01)
*G06T 5/10*    (2006.01)

(52) U.S. Cl.
CPC .. *G06T 5/001* (2013.01); *G06T 5/10* (2013.01)

(58) Field of Classification Search
None
See application file for complete search history.

(56) References Cited

U.S. PATENT DOCUMENTS

2011/0188780 A1*  8/2011  Wang et al. .................. 382/293
2012/0243792 A1   9/2012  Kostyukov et al.
2013/0093850 A1*  4/2013  Lin et al. ..................... 348/46
2013/0100272 A1*  4/2013  Price et al. ................... 348/79
2013/0329122 A1* 12/2013  Geisler et al. ................ 348/345

FOREIGN PATENT DOCUMENTS

WO    2012161829 A2    11/2012

OTHER PUBLICATIONS

Burge and Geisler, "Optimal defocus estimation in individual natural images," Proceedings of the National Academy of Sciences, Oct. 4, 2011, vol. 108, No. 40, pp. 16849-16854.

* cited by examiner

*Primary Examiner* — Sumati Lefkowitz
*Assistant Examiner* — Jiangeng Sun
(74) *Attorney, Agent, or Firm* — John P. O'Banion

(57) ABSTRACT

Apparatus and methods for estimating defocus direction from a single image obtained, such as in a digital camera apparatus, are presented. To determine defocus direction, point spread function (PSF) differences for the image are evaluated in the frequency domain, with frequency pairs being found having largest difference in their Fourier transform magnitudes, from which a direction estimate feature is extracted, and defocus direction estimated based on relation of estimated feature and statistics derived from camera image tests. The method can be applied for controlling autofocus mechanisms in cameras, or other applications requiring rapid determination of defocus directions, such as from a single image.

20 Claims, 10 Drawing Sheets

Picture1

Picture2

134 — Determine at Least One Pair of Frequencies $\{r_{Fi}, r_{Bi}\}$ in which $\bar{f}_F(r_{Fi})$ and $\bar{f}_B(r_{Bi})$ are local minimums which satisfy
$\bar{f}_F(r_{Fi}) > a\bar{f}_F(r_{Fi})$ and $\bar{f}_B(r_{Fi}) > a\bar{f}_B(r_{Bi})$ for $i = 1, 2, \ldots, I$
where $a$ is a constant scalar, and $I$ is the number of frequency pairs 136 — Extract a Direction Estimation Feature $R_i = \dfrac{\bar{y}(r_{Fi})}{\bar{y}(r_{Bi})} = \dfrac{\sum\limits_{(u,v):u^2+v^2=r_{Fi}^2}|\hat{y}(u,v)|}{\sum\limits_{(u,v):u^2+v^2=r_{Bi}^2}|\hat{y}(u,v)|}$ 138 — Estimate Distribution of Features $R_i$, by determining $R_i$ using training images with its sample average and standard deviation as estimates of mean and standard deviation of Distribution of Features $R_i$ 140 — Evaluate Probability Relationship Based on Probabilities of Learned Distribution of Features $R_i$ to determine if defocus is in-front or behind focus plane

FIG. 11B

CAMERA DEFOCUS DIRECTION ESTIMATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Field of the Technology

This disclosure pertains generally to digital camera focus control, and more particularly to estimating the direction of defocus within a digital camera.

2. Background Discussion

In digital photography it is often important to know the distance, in units of depth of field (DOF), between the present position and the in-focus position of the focus plane. It will be noted that when capturing an image using a digital camera, the captured image will be defocused if the target object is not on the focus plane. Although it is possible to know the distance in units of depth of field (DOF) from the object to the focus plane by estimating the defocus blur, it is unknown using current methods whether the object is in front or behind the focus plane. It should be appreciated, that the same distance in DOF in front or behind the focus plane will result in very similar amount of defocus blur. Present techniques do not overcome this significant ambiguity during depth estimation and auto focusing.

Accordingly, the present disclosure describes a mechanism for readily determining the direction of defocus, which overcomes the shortcomings of previous defocus estimation techniques.

BRIEF SUMMARY OF THE TECHNOLOGY

Methods and apparatus are described for determining defocus direction, being either in-front, or behind, the focus plane of the object captured in an image by the camera. Rapidly determining this direction from a single image, allows autofocusing to be performed more readily, while it is applicable to other applications benefitting from a single image mechanism for determining defocus direction.

Defocus direction is estimated from a frequency domain analysis of the camera defocus point spread functions (PSFs) of the captured image. Differences in the PSFs are evaluated in the frequency domain in relation to training images to estimate feature distributions. Statistics are then applied to make the determination whether the image was taken in-front, or behind, the focus plane for the object.

Further aspects of the technology will be brought out in the following portions of the specification, wherein the detailed description is for the purpose of fully disclosing preferred embodiments without placing limitations thereon.

BRIEF DESCRIPTION OF THE SEVERAL VIEWS OF THE DRAWING(S)

The disclosure will be more fully understood by reference to the following drawings which are for illustrative purposes only:

FIG. 11A and FIG. 11B is a flow diagram of defocus direction estimation according to an embodiment of the present disclosure, showing a level of particularity based on example equations.

DETAILED DESCRIPTION

Figure 1:
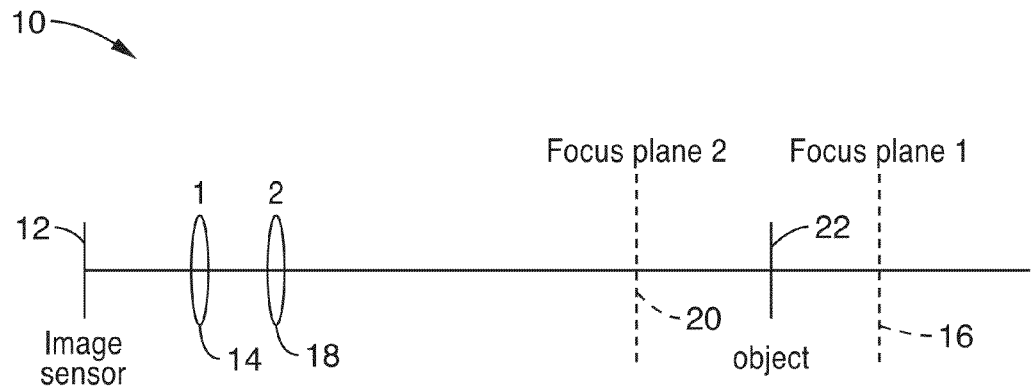
FIG. 1 is a diagram of defocus direction and the ambiguity of lens position addressed according to embodiments of the present disclosure.

FIG. 1 illustrates a diagram 10 of the autofocus ambiguity issue in which the direction of defocus is ambiguous. An image sensor 12 is shown in relation to a first lens position 14, yielding a first focus plane 16, and a second lens position 18 and associated second focus position 20. An ambiguity arises using traditional autofocus mechanisms in determining whether the lens is actually in the first position 14 or second position 18 in relation to object 22.

When capturing an image with a digital camera, if an object is not on the focus plane, then the captured image will be defocused. It is possible to know the distance in units of depth of field (DOF) from the object to the focus plane by estimating defocus blur, which is a process known in the art and one for which the assignee holds multiple patents.

However, it is unknown in this process whether the object is in front or behind the focus plane, since the same distance in DOF in front or behind the focus plane results in a very similar amount of defocus blur. This ambiguity poses a significant impediment in both depth estimation and auto focusing.

Figure 2:
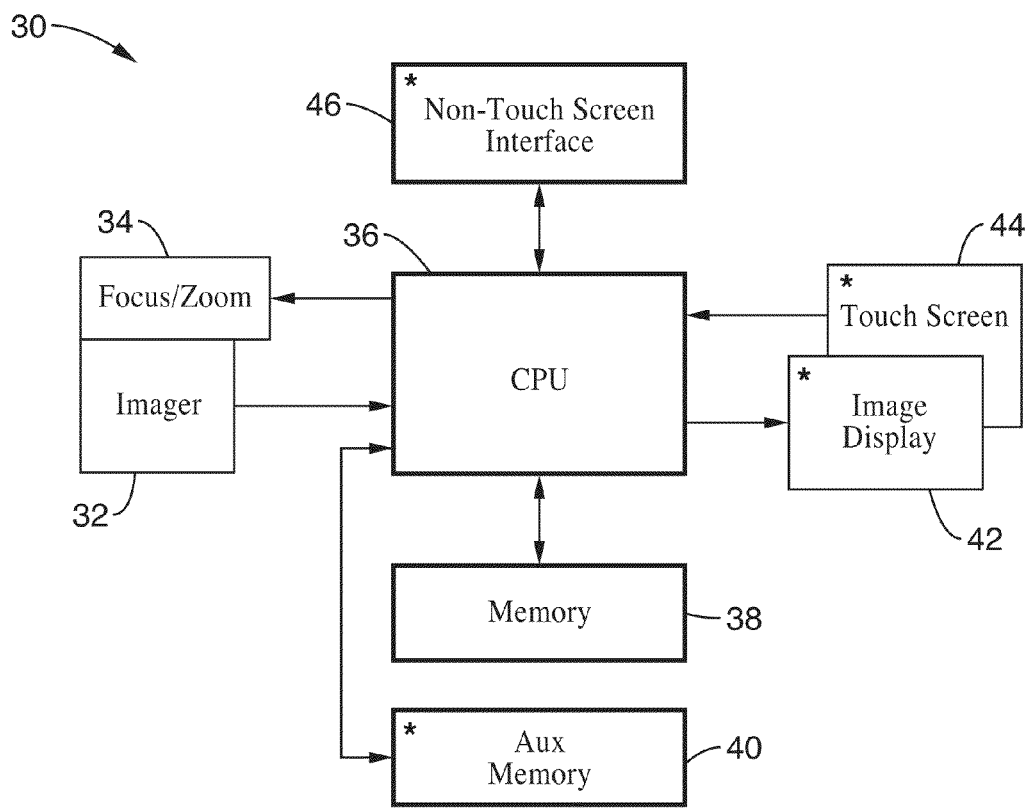
FIG. 2 is a block diagram of a camera apparatus configured for performing camera defocus direction estimation according to an embodiment of the present disclosure.

FIG. 2 illustrates an example embodiment 30 of an electronic device within which camera defocus direction estimation is performed, such as within an image capture device, such as a digital still and/or video camera. An imager 32 is shown for outputting collected images to a computer processor 36 (e.g., one or more central processing units (CPUs), microcontrollers, and/or digital signal processors (DSPs)), which is coupled to at least one memory 38 and optionally to auxiliary memory 40, such as removable media.

Other elements are depicted for a conventional image capturing system, camera, including a focus/zoom control 34, and interfaces shown by way of example as an optional image display 42, optional touch screen 44, and optional non-touch screen interface 46, which exist on typical camera systems, although they are not necessary for practicing the present technology.

Computer processor 36 in combination with memory 38 (and/or auxiliary memory 40) performs defocus direction estimation, which can be utilized, for example, within an autofocusing process of imaging device 30. The defocus direction estimation is performed in response to instructions executed from memory 38 and/or auxiliary memory 40.

It will be appreciated that programming stored on memory 38 (40), is executable on computer processor 36. The present technology is non-limiting with regard to the configuration of this memory, insofar as it is non-transitory in nature, and thus not constituting a transitory electronic signal.

Accordingly, the present technology may include any form of computer-readable media, including those which are random access (e.g., RAM), require periodic refreshing (e.g., DRAM), those that degrade over time (e.g., EEPROMS, FLASH, disk media), or that store data for only short periods of time and/or only in the presence of power, with the only limitation being that the term "computer readable media" is not applicable to an electronic signal which is transitory.

It should be appreciated that the technological teachings are not limited to the camera device exemplified in FIG. 2, but may be utilized in any device configured for capturing and/or processing images, wherein information about the PSF of the image capture device can be obtained. Other devices upon which the present technology can be implemented include, but are not limited to: still cameras, video cameras, combination still and video cameras, camera equipped cell phones, camera equipped laptops/notebooks, scanners, security cameras, and applications for performing 2D to 3D image conversions.

Before proceeding with the discussion of defocus direction estimation, it is important to understand the concept of focus in relation to step edges.

Figure 3A:
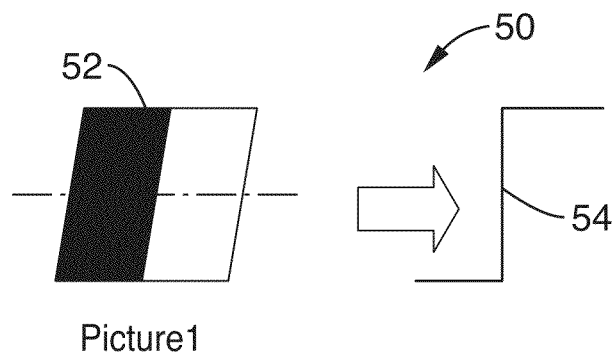
FIG. 3A and FIG. 3B are diagrams of image focus in relation to step edges utilized according to an embodiment of the present disclosure.

FIG. 3A depicts a condition 50 in which subject 52 is in focus, such that the captured image is the sharpest, as represented by the sharp contrast curve 54, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, so that the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different aspects of video capture and output.

Figure 3B:
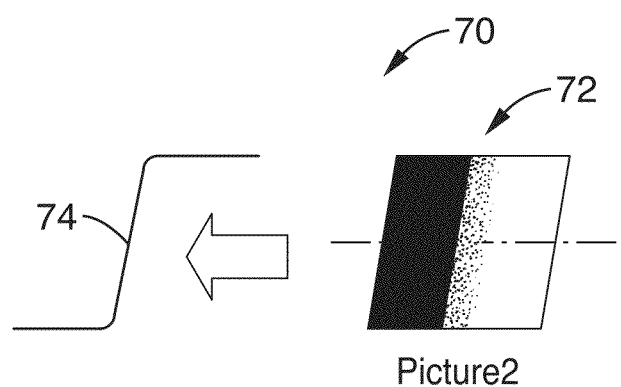

FIG. 3B depicts the condition 70 as the image of object 72 becomes increasingly blurry as the lens moves away from the 'in-focus' position, with a resulting sloped contrast curve 74 shown. The focal distances at which the pictures are taken and the amount of the blur difference between these two pictures can be utilized for estimating actual subject distance, or depth.

Figure 4A:
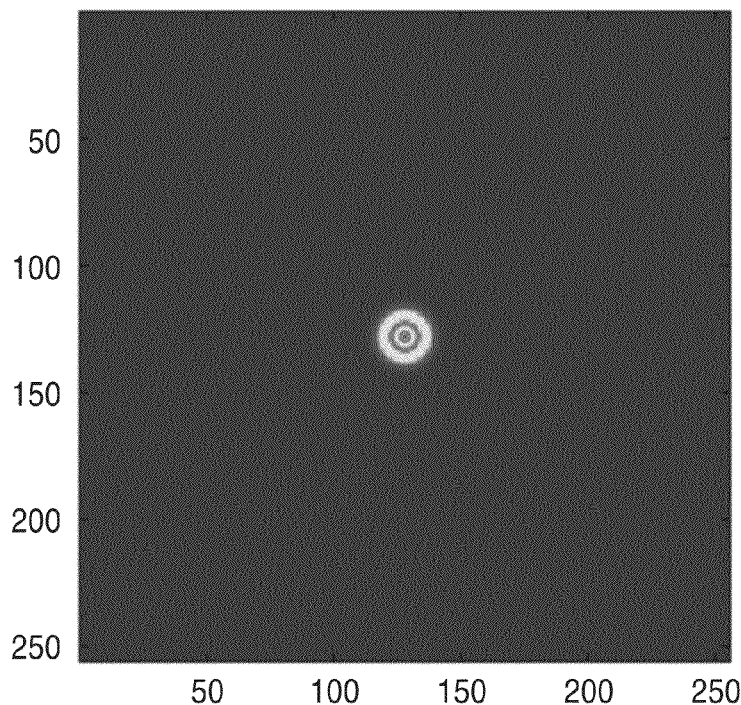
FIG. 4A and FIG. 4B are images of point spread functions (PSFs) at 5 depths of field (DOFs) in front, and behind, the focus plane exemplifying a defocus direction problem resolved according to an embodiment of the present disclosure.
Figure 4B:
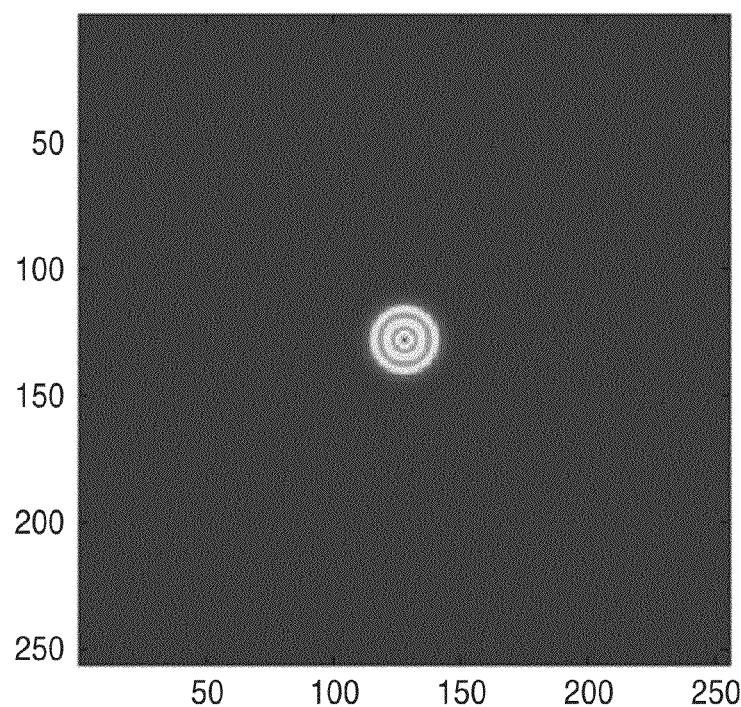

FIG. 4A and FIG. 4B compare the point spread functions (PSFs) for a specific digital camera at two defocus positions, exemplified here as 5 DOF, in-front of the focus plane in FIG. 4A, and behind the focus plane in FIG. 4B. It will be recognized that point spread function (PSF) describes the response of an imaging system to a point source or point object, and is more generally referred to as the impulse response a focused optical system. Functionally, PSF is the spatial domain version of the transfer function of the imaging system. The subtle differences seen in the FIG. 4A and FIG. 4B images are due to spherical aberration. It will be noted that although these focus positions are the same distance (in units of DOF) from the focus plane, their PSFs have very subtle differences. In captured images, the PSFs cannot be observed. Instead, ideal images are observed which are convolved with the PSFs.

Figure 5:
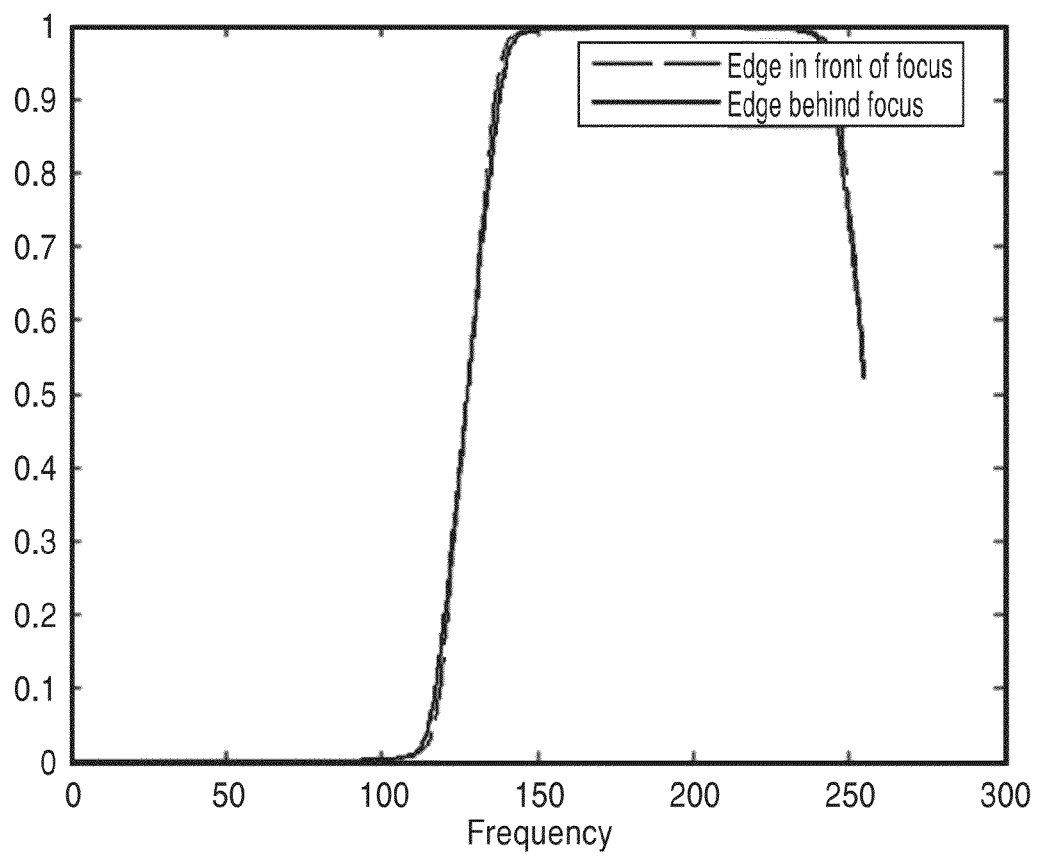
FIG. 5 is a plot of step edges convolved with point spread functions (PSFs) in front, and behind, the focus plane exemplifying a defocus direction problem resolved according to an embodiment of the present disclosure.

FIG. 5 depicts an example plot of an observed signal for a step edge convolved with PSFs in front and behind the focus plane, of 5 DOF in-front of, and behind the focus plane. It will be noted that the difference between the two signals is difficult to discern, making it problematic to directly distinguish which one is captured in front of the focus plane and which one is captured behind the focus plane.

Figure 6A:
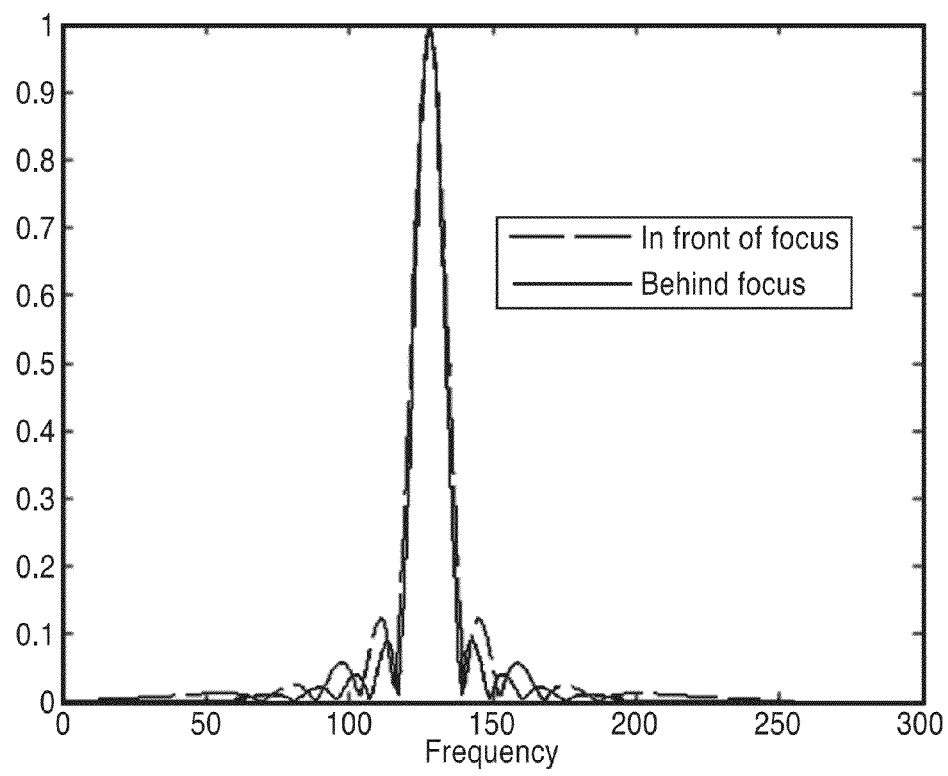
FIG. 6A and FIG. 6B are a plot and a magnified section thereof, respectively, of Fourier transform magnitude of point spread functions (PSFs) showing increased distinction in the frequency domain from which defocus direction is determined according to an embodiment of the present disclosure.
Figure 6B:
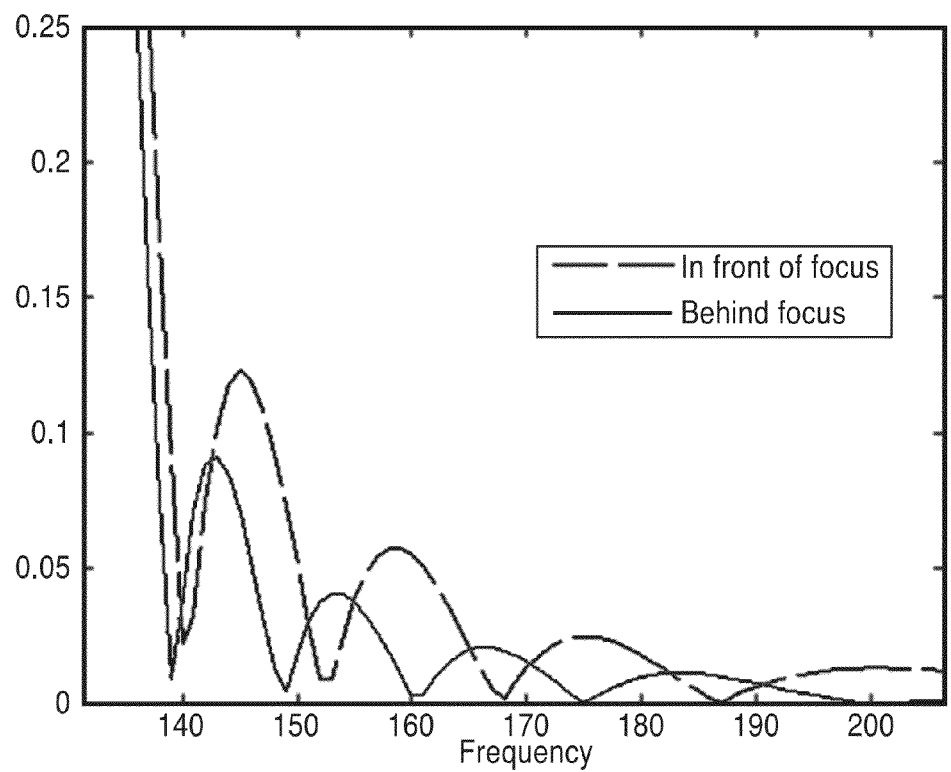

FIG. 6A and FIG. 6B depict magnitude plots of Fourier transform of PSFs. By taking a Fourier transform of the PSFs, the difference between the in-front or behind the focus plane becomes more prominent. In FIG. 6A, one can see a readily discernable distinction between the plots, while FIG. 6B depicts a magnified section of the plot in which the differences are even more readily apparent.

Figure 7A:
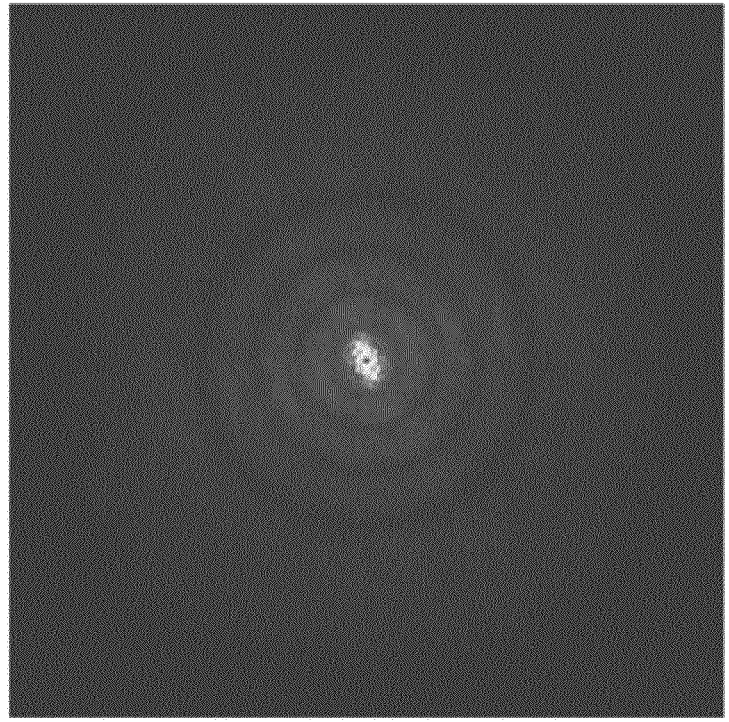
FIG. 7A and FIG. 7B are images of point spread functions (PSFs) of Fourier transforms in front and behind the focus plane demonstrating aspects of discerning defocus direction according to an embodiment of the present disclosure.
Figure 7B:
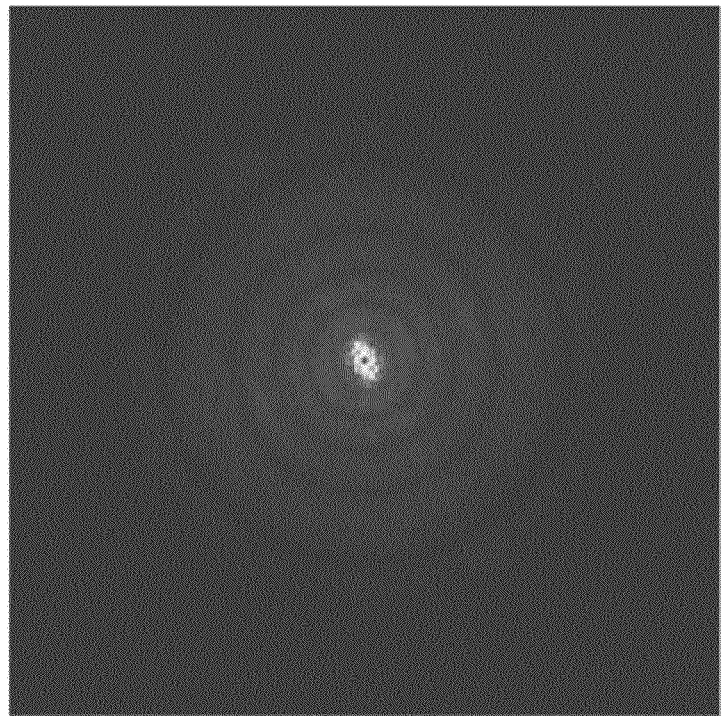

FIG. 7A and FIG. 7B compare Fourier transforms of the PSFs at 5 DOF in-front of the focus plane in FIG. 7A, and 5 DOF behind the focus plane in FIG. 7B. Concentric circles are seen in the above Fourier transform images. The circle locations are different between the Fourier transform images in FIG. 7A representing defocus of 5 DOF in front of the focus position, and for FIG. 7B representing defocus of 5 DOF behind the focus position. These concentric circles correspond to local minimums and are at the same position as the local minimums seen in FIG. 6A and FIG. 6B.

The following describes the process of determining camera defocus direction on a mathematical level.

Letting x denote the ideal image without defocus blur, f to denote the PSF, and y to denote the observed defocused image, one has:

$$y = x \otimes f \quad (1)$$

and in the frequency domain this is:

$$\hat{y} = \hat{x} \cdot \hat{f} \quad (2)$$

where ŷ, x̂ and f̂ are Fourier transforms of y, x and f, and convolution turns into product. It should be appreciated that if the Fourier transforms of the image f(x,y) and the filter g(x,y) are F(u,v) and G(u,v), respectively, then in the Fourier domain the convolution operation becomes simple point-by-point multiplication f(x,y)×g(x,y) ⇔ F(u,v)•G(u,v), as this can be utilized for speeding up convolution calculations. In the above, u and v are the frequency coordinates. Accordingly, a null frequency or local minimum of f̂ will result in a local minimum of ŷ, regardless of the unknown ideal image x. Thus, the present technology utilizes the differences in frequency domain to identify whether the defocus occurs in front of, or behind, the focus plane.

In the apparatus and method, frequency pairs are first found where the difference between frequency responses of in-front and behind PSFs is large. It should be noted that frequency pairs are found with the help of the Fourier transform, and not after performing the Fourier transform. The terms $f_F$ and $f_B$ are used to denote the defocus PSF of in-front and behind focus plane respectively. Then the terms $\hat{f}_F$ and $\hat{f}_B$ to denote the corresponding Fourier transform of $f_F$ and $f_B$. As the majority of defocus PSFs are isotropic, the magnitude of Fourier transform values is averaged at the same distance to the origin, yielding the following:

$$\bar{f}_F(r) = \frac{1}{N_r} \sum_{(u,v):u^2+v^2=r^2} |\hat{f}_F(u,v)| \quad (3)$$

$$\bar{f}_B(r) = \frac{1}{N_r} \sum_{(u,v):u^2+v^2=r^2} |\hat{f}_B(u,v)|$$

where $N_r$ is the number of pixels on the circle with radius r, while u and v are frequency coordinates. This averaging turns the two dimensional functions $\hat{f}_F(u,v)$ and $\hat{f}_B(u,v)$ into one dimensional functions $\bar{f}_F(r)$ and $\bar{f}_B(r)$. The apparatus and/or method determines one or more pairs of frequencies $\{r_{Fi}, r_{Bi}\}$, such that $\bar{f}_F(r_{Fi})$ and $\bar{f}_B(r_{Fi})$ are local minimums which satisfy:

$$\bar{f}_F(r_{Bi}) > a\bar{f}_F(r_{Fi})$$

$$\bar{f}_B(r_{Fi}) > a\bar{f}_B(r_{Bi}) \text{ for } i=1,2,\ldots,I, \quad (4)$$

where a is a constant scalar which can be empirically obtained, for example in these demonstrations a is set to 4, and I is the number of frequency pairs.

Figure 8:
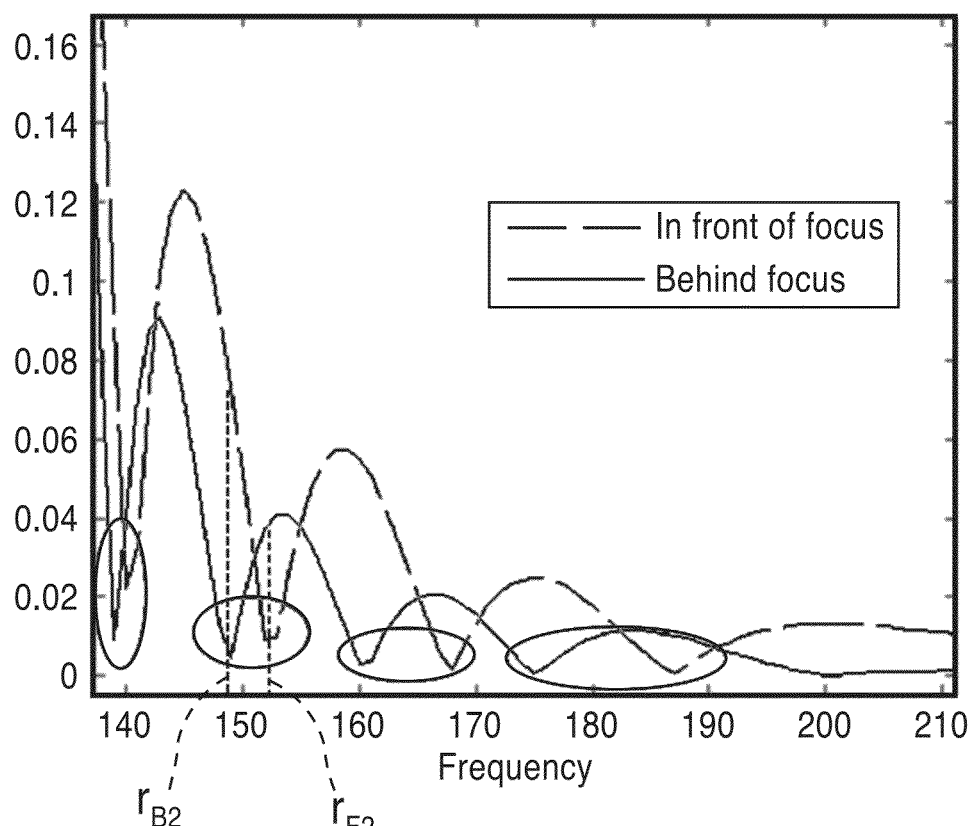
FIG. 8 is a plot of Fourier transform PSFs showing identification of frequency pairs utilized according to an embodiment of the present disclosure.

FIG. 8 depicts a magnitude plot of Fourier transform of PSFs showing four different frequency pairs marked with ellipses, the second pair of which illustrates $r_{F2}$ and $r_{B2}$.

Finally, a direction estimation feature is determined for estimating defocus direction:

$$R_i = \frac{\bar{y}(r_{Fi})}{\bar{y}(r_{Bi})} = \frac{\sum_{(u,v):u^2+v^2=r_{Fi}^2} |\hat{y}(u,v)|}{\sum_{(u,v):u^2+v^2=r_{Bi}^2} |\hat{y}(u,v)|}. \quad (5)$$

It should be appreciated that this direction estimation feature is preferably determined as a ratio between radial components of Fourier transforms. These components may be averaged over the angle, however, this is not necessary because Fourier transforms are substantially symmetric as seen in FIG. 8. Alternatively, other "features," such as "frequency features" can be considered for describing the difference between "in-front" and "behind" patterns in frequency domain. Once the direction estimation feature is determined, then training images are utilized in a statistical process to estimate distribution of the features $\{R_i\}_{i=1, 2, \ldots, I}$ and apply the estimated distribution on testing images to estimate the defocus direction. It is assumed that each direction estimation feature $R_i$ follows a Gaussian distribution, whose mean and standard deviation are estimated. The training images can be obtained by either convolving PSFs with ideal images or obtained directly from camera capture with known distance to focus. Direction estimation feature $R_i$ is then computed from each training image patch, and its sample average and standard deviation are utilized as estimates of mean (μ) and standard (σ) deviation for distribution of $R_i$.

Specifically, the method obtains $(\mu_{Fi}, \sigma_{Fi})$ and $(\mu_{Bi}, \sigma_{Bi})$ so that the distribution of direction estimation feature $R_i$ for in front and behind focus can be described as:

$$p(R_i | D = 1) = \frac{1}{\sqrt{2\pi} \sigma_{Fi}} \exp\left\{-\frac{(R_i - \mu_{Fi})^2}{2\sigma_{Fi}^2}\right\} \quad (6)$$

$$p(R_i | D = 0) = \frac{1}{\sqrt{2\pi} \sigma_{Bi}} \exp\left\{-\frac{(R_i - \mu_{Bi})^2}{2\sigma_{Bi}^2}\right\}$$

where D=1 represents in front of focus plane, and D=0 represents behind focus plane. For any input testing image, direction estimation features can be determined $\{R_i\}_{i=1, 2, \ldots, I}$ and the probability estimated of D=1 and D=0 as:

$$p(D = 1 | \{R_i\}) = \frac{p(D = 1) \prod_{i=1}^{I} p(R_i | D = 1)}{p(\{R_i\})} \quad (7)$$

$$p(D = 0 | \{R_i\}) = \frac{p(D = 0) \prod_{i=1}^{I} p(R_i | D = 0)}{p(\{R_i\})}$$

It is reasonable to assume prior probability p(D=1)=p(D=0)=0.5, since it is equally likely for defocus to occur in front or behind the focus plane.

Therefore, if the following relation is true:

$$\prod_{i=1}^{I} p(R_i | D = 1) > \prod_{i=1}^{I} p(R_i | D = 0), \quad (8)$$

then it has been estimated that defocus occurs in front of the focus plane, otherwise defocus is considered to occur behind the focus plane.

Figure 9:
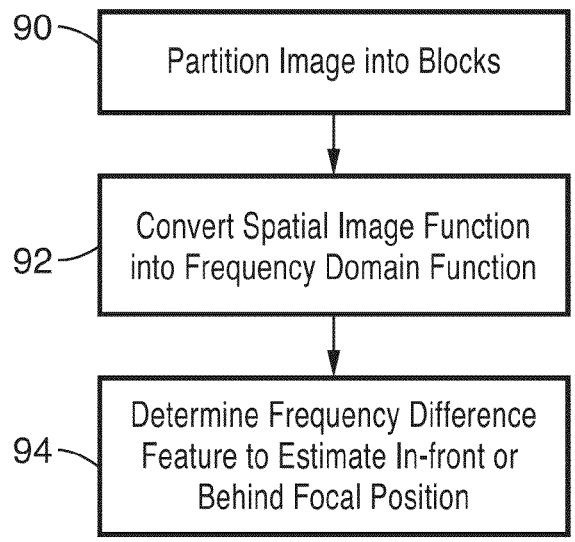
FIG. 9 is a flow diagram of defocus direction estimation according to an embodiment of the present disclosure.

FIG. 9 through FIG. 11B describe defocus direction estimation according to the present disclosure at different levels of particularity. In FIG. 9 the image is partitioned into blocks 90, then each block is converted from a spatial image function into a frequency domain function 92, which is not limited to the use of Fourier transformation, as other forms of conversion can be utilized (e.g., discrete cosine transform). A frequency difference feature 94 is then calculated to determine whether the image was captured at an in-front or behind position in relation to the focal point for the target in the image.

It will be seen in FIG. 9 that the image, or video frame, is partitioned into blocks, as frequency analysis cannot be performed on a pixel level. However, the present technology can be applied to blocks of various sizes, and to a single block, or to all the blocks. The size of the block is important, because a block that is too small contains insufficient frequency information for determining defocus direction. Conversely, the block size can be made too large, wherein multiple depths are contained within the block, complicating applications of the present technology. By way of example and not limitation, the block size utilized in an auto focus camera application may encompass the size of the focus window. In at least one embodiment, block size selection is adjustable and it is automatically adjusted on the basis of a preliminary image analysis, such as regarding the extent of image detail. For example, if the image contains mainly flat areas, the block size can be enlarged. Alternatively, if many fine details exist in the image, the window (block size) can be made smaller. Block size can vary across the image, in response to the level of image detail.

The present technological teachings can be applied to any device involved with the capturing of images or receiving of images from an image capture element/device. The teachings are particularly well-suited for use on any device containing a camera (i.e., image capture element/device), such as a still camera, video camera, cell phone containing a camera, laptop/notebook containing a camera, scanner, security cameras, and so forth. It should be appreciated, that for each case, information is required about the camera (e.g., its PSF function) that captured the image.

Another application for which this technology is particularly well-suited is in the process of 2D to 3D image conversion. It should be appreciated that many 2D to 3D conversion methods utilize image blur estimation, based on the idea that the further the distance from the object-in-focus the larger the blur. As previously described, multiple blur estimation techniques are known in the art. Utilizing blur estimation, it is therefore possible to create a depth map based on this assumption and use the depth map and 2D image to generate left and right stereo pair or multiple views of the scene. However, a shortcoming with this approach is that if the scene has items that are closer than the object-in-focus, then these items are also blurred, which after 2D to 3D conversion these objects can appear in the wrong place (far away), or vice-versa. The present technology provides a simple mechanism for discriminating between closer than the object-in-focus and further than the object-in-focus items, and can be utilized with known depth estimation techniques as a step in the 2D to 3D conversion process.

Figure 10:
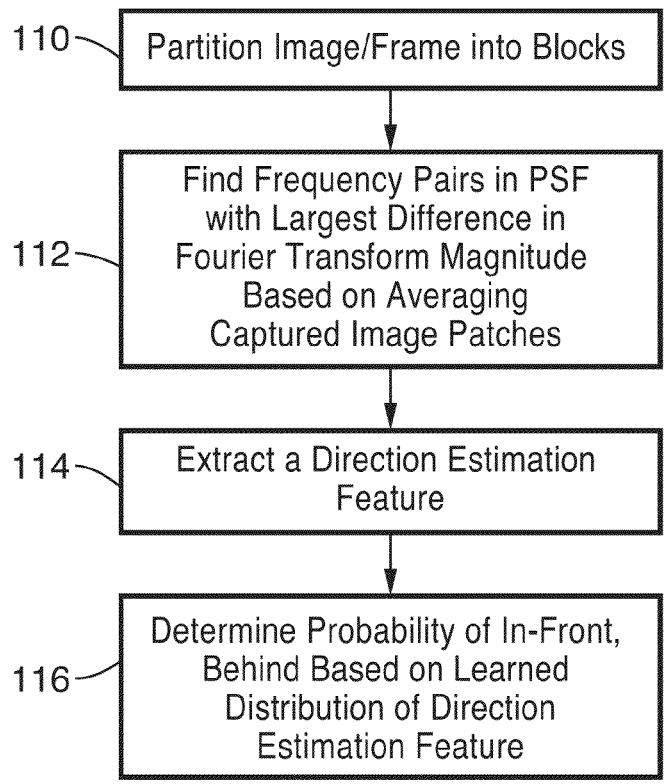
FIG. 10 is a flow diagram of defocus direction estimation according to an embodiment of the present disclosure, showing increased particularity in relation to FIG. 9.

FIG. 10 illustrates another example embodiment. The image (or frame) is partitioned into blocks 110, within which frequency pairs in the PSF are found with largest difference in transform magnitude based on averaging captured image patches 112. It should be appreciated that although Fourier transform is described, other frequency transform mechanisms can be utilized without departing from the teachings of the present technology. A direction estimation feature is extracted 114, and a probability analysis performed which determines 116 probability of in-front or behind focus position based on learned distribution of the direction estimation feature.

Figure 11A:
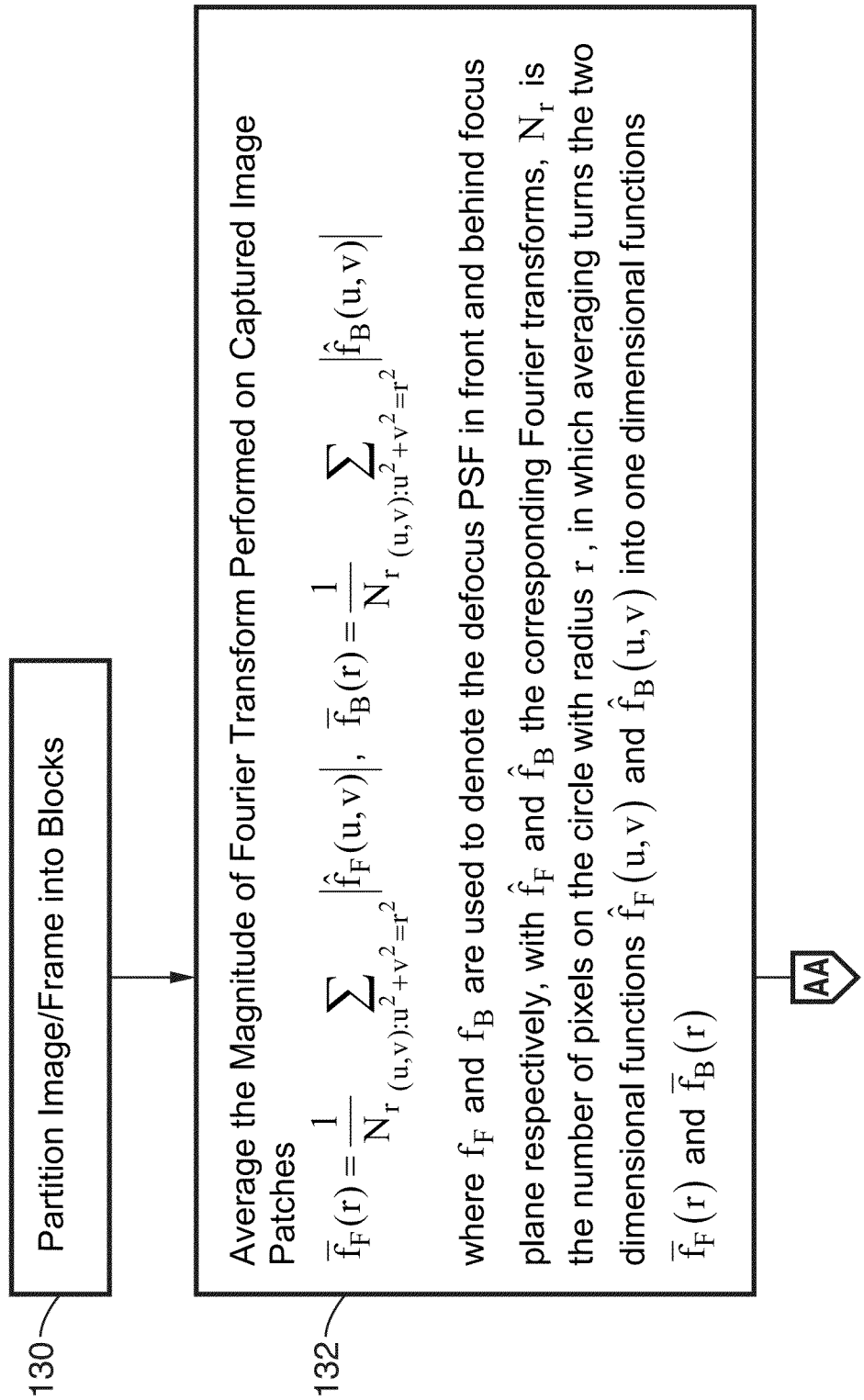

FIG. 11A and FIG. 11B illustrate a very detailed description of this technology in relation to equations which were described in prior sections of the application. Referring to FIG. 11A, the image (or frame) is partitioned into blocks 130. An average is taken on magnitude of Fourier transform performed on capture image portions (patches) 132. Again, it should be appreciated that although Fourier transform is described, other transform mechanisms can be utilized as described in a prior section. In FIG. 11B, at least one pair of local minimum frequencies are found 134 which satisfy the given conditions. A direction estimation feature is extracted 136, and distribution of the direction estimation feature is estimated 138 in response to training images. Finally a probability analysis is performed 140 on the in-front or behind focus position based on probabilities of learned distribution of direction estimation features.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that this technology can be embodied in various ways, including the following:

1. An apparatus for determining defocus direction from an image, comprising: a processor configured for processing an image which has been captured from an image capture element or device; programming executable on said processor for determining defocus direction of the image, said processing comprising: partitioning the image into blocks; converting a spatial image function of each said block of the image into a frequency domain function; and determining a frequency difference feature to indicate in-front or behind position of the image in relation to a correct focus position for that image.

2. The apparatus of any of the previous embodiments, wherein said apparatus comprises a camera device configured for still image capture, or for video image capture, or for a combination of still and video image capture.

3. The apparatus of any of the previous embodiments, wherein said apparatus comprises a device capable of capturing images selected from the group of electronic devices consisting of camera equipped cell phone, camera equipped laptop/notebook, scanner, security cameras.

4. The apparatus of any of the previous embodiments, wherein said apparatus is utilized as a step in the process of 2D to 3D image conversions.

5. The apparatus of any of the previous embodiments, wherein said defocus direction of the image indicates whether the image was captured either in-front of a focus plane for a target object, or behind the focus plane of that target object.

6. The apparatus of any of the previous embodiments, wherein said determining a frequency difference feature is performed in response to differences in point spread functions (PSFs) evaluated in a frequency domain between captured images and training images to estimate feature distributions 7. The apparatus of any of the previous embodiments, wherein said frequency domain function comprises a Fourier transformation.

8. The apparatus of any of the previous embodiments, wherein determining a frequency difference feature to indicate in-front or behind position of the image is performed in response to a statistical process estimating distribution of the difference feature on training images.

9. An apparatus for determining defocus direction from an image, comprising: a processor configured for processing an image which has been captured from an image capture element or device; programming executable on said processor for determining defocus direction of the image, said processing comprising: partitioning the image into blocks; converting a spatial image function of each said block of the image into a frequency domain function; and determining a frequency difference feature to indicate in-front or behind position of the image in relation to a correct focus position for that image, performed in response to a statistical process estimating distribution of the difference feature on training images.

10. The apparatus of any of the previous embodiments, wherein said apparatus comprises a camera device configured for still image capture, or for video image capture, or for a combination of still and video image capture.

11. The apparatus of any of the previous embodiments, wherein said apparatus comprises a device capable of capturing images selected from the group of electronic devices consisting of camera equipped cell phone, camera equipped laptop/notebook, scanner, security cameras.

12. The apparatus of any of the previous embodiments, wherein said apparatus is utilized as a step in the process of 2D to 3D image conversion.

13. The apparatus of any of the previous embodiments, wherein said defocus direction of the image indicates whether the image was captured either in-front of a focus plane for a target object, or behind the focus plane of that target object.

14. The apparatus of any of the previous embodiments, wherein said frequency domain function comprises a Fourier transformation.

15. A method of determining defocus direction from an image, comprising: (a) partitioning an image into blocks within a device configured for video processing; (b) converting a spatial image function of each said block into a frequency domain function; and (c) determining a frequency difference feature to indicate in-front or behind position of the image, as a defocus direction, in relation to a correct focus position for at least one target within that image; (d) wherein said defocus direction of the image indicates whether the image was captured either in-front of a focus plane for a target object, or behind the focus plane of that target object.

16. The method of any of the previous embodiments, wherein said device configured for video processing comprises a device capable of capturing images selected from the group of electronic devices consisting of still cameras, video cameras, combination still and video cameras, camera equipped cell phones, camera equipped laptops/notebooks, scanners and security cameras.

17. The method of any of the previous embodiments, wherein said method is utilized as a step in the process of 2D to 3D image conversion.

18. The method of any of the previous embodiments, wherein said determining a frequency difference feature is performed in response to differences in point spread functions (PSFs) evaluated in a frequency domain between captured images and training images to estimate feature distributions.

19. The method of any of the previous embodiments, wherein said frequency domain function comprises a Fourier transformation.

20. The method of any of the previous embodiments, wherein determining a frequency difference feature to indicate in-front or behind position of the image is performed in response to a statistical process estimating distribution of the difference feature on training images.

Although the description above contains many details, these should not be construed as limiting the scope of the present technology but as merely providing illustrations of some of the presently preferred embodiments. Therefore, it will be appreciated that the scope of the present technology fully encompasses other embodiments which may become obvious to those skilled in the art, and that the scope of the present technology is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present technology, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for determining defocus direction from an image, comprising:
 (a) a processor configured for processing an image which has been captured from an image capture element or device; and
 (b) programming executable on said processor for determining defocus direction of the image, said processing comprising:
  (i) partitioning the image into blocks;

(ii) converting a spatial image function of each said block of the image into a frequency domain function, and convolving with a point spread function (PSF) while finding frequency pairs in the PSF with largest differences in transform magnitude;

(iii) averaging transform magnitudes at the same radial distances to their origins, thus converting a two dimensional frequency domain function into a one dimensional frequency domain function;

(iv) determining one or more pairs of local minimums in the one dimensional frequency domain function; and (v) determining a frequency difference feature as a ratio between radial components of the transform within said one or more pair of minimums to indicate in-front or behind position of the image in relation to a correct focus position for that image.

2. The apparatus recited in claim 1, wherein said apparatus comprises a camera device configured for still image capture, or for video image capture, or for a combination of still and video image capture.

3. The apparatus recited in claim 1, wherein said apparatus comprises a device capable of capturing images selected from the group of electronic devices consisting of camera equipped cell phone, camera equipped laptop/notebook, scanner, security cameras.

4. The apparatus recited in claim 1, wherein said apparatus is utilized as a step in the process of 2D to 3D image conversions.

5. The apparatus recited in claim 1, wherein said defocus direction of the image indicates whether the image was captured either in-front of a focus plane for a target object, or behind the focus plane of that target object.

6. The apparatus recited in claim 1, wherein said determining a frequency difference feature is performed in response to differences in point spread functions (PSFs) evaluated in a frequency domain between captured images and training images to estimate feature distributions.

7. The apparatus recited in claim 1, wherein said frequency domain function comprises a Fourier transformation.

8. The apparatus recited in claim 1, wherein determining a frequency difference feature to indicate in-front or behind position of the image is performed in response to a statistical process estimating distribution of the difference feature on training images.

9. An apparatus for determining defocus direction from an image, comprising:
(a) a processor configured for processing an image which has been captured from an image capture element or device; and
(b) programming executable on said processor for determining defocus direction of the image, said processing comprising:
(i) partitioning the image into blocks;
(ii) converting a spatial image function of each said block of the image into a frequency domain function, and convolving with a point spread function (PSF) while finding frequency pairs in the PSF with largest differences in transform magnitude; and
(iii) averaging transform magnitudes at the same radial distances to their origins, thus converting a two dimensional frequency domain function into a one dimensional frequency domain function;
(iv) determining one or more pairs of local minimums in the one dimensional frequency domain function; and
(v) determining a frequency difference feature as a ratio between radial components of the transform within said one or more pair of minimums to indicate in-front or behind position of the image in relation to a correct focus position for that image, performed in response to a statistical process estimating distribution of the difference feature on training images.

10. The apparatus recited in claim 9, wherein said apparatus comprises a camera device configured for still image capture, or for video image capture, or for a combination of still and video image capture.

11. The apparatus recited in claim 9, wherein said apparatus comprises a device capable of capturing images selected from the group of electronic devices consisting of camera equipped cell phone, camera equipped laptop/notebook, scanner, security cameras.

12. The apparatus recited in claim 9, wherein said apparatus is utilized as a step in the process of 2D to 3D image conversion.

13. The apparatus recited in claim 9, wherein said defocus direction of the image indicates whether the image was captured either in-front of a focus plane for a target object, or behind the focus plane of that target object.

14. The apparatus recited in claim 9, wherein said frequency domain function comprises a Fourier transformation.

15. A method of determining defocus direction from an image, comprising:
(a) partitioning an image into blocks within a device configured for video processing;
(b) converting a spatial image function of each said block into a frequency domain function, and convolving with a point spread function (PSF) while finding frequency pairs in the PSF with largest differences in transform magnitude;
(c) averaging transform magnitudes at the same radial distances to their origins, thus converting a two dimensional frequency domain function into a one dimensional frequency domain function;
(d) determining one or more pairs of local minimums in the one dimensional frequency domain function; and
(e) determining a frequency difference feature as a ratio between radial components of the transform within said one or more pair of minimums to indicate in-front or behind position of the image, as a defocus direction, in relation to a correct focus position for at least one target within that image;
(f) wherein said defocus direction of the image indicates whether the image was captured either in-front of a focus plane for a target object, or behind the focus plane of that target object.

16. The method recited in claim 15, wherein said device configured for video processing comprises a device capable of capturing images selected from the group of electronic devices consisting of still cameras, video cameras, combination still and video cameras, camera equipped cell phones, camera equipped laptops/notebooks, scanners and security cameras.

17. The method recited in claim 15, wherein said method is utilized as a step in the process of 2D to 3D image conversion.

18. The method recited in claim 15, wherein said determining a frequency difference feature is performed in response to differences in point spread functions (PSFs) evaluated in a frequency domain between captured images and training images to estimate feature distributions.

19. The method recited in claim 15, wherein said frequency domain function comprises a Fourier transformation.

20. The method recited in claim 15, wherein determining a frequency difference feature to indicate in-front or behind position of the image is performed in response to a statistical process estimating distribution of the difference feature on training images.

\* \* \* \* \*